United States Patent
Thomaschewski (10) Patent No.: US 10,618,658 B2
(45) Date of Patent: Apr. 14, 2020

(54) FLOOR CONNECTION ASSEMBLY OF AN AIRCRAFT SEAT

(71) Applicant: LUFTHANSA TECHNIK AG, Hamburg (DE)

(72) Inventor: Oliver Thomaschewski, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 77 days.

(21) Appl. No.: 14/403,500

(22) PCT Filed: May 24, 2013

(86) PCT No.: PCT/EP2013/001528
§ 371 (c)(1),
(2) Date: Nov. 24, 2014

(87) PCT Pub. No.: WO2013/174518
PCT Pub. Date: Nov. 28, 2013

(65) Prior Publication Data
US 2015/0115101 A1    Apr. 30, 2015

(30) Foreign Application Priority Data
May 24, 2012 (DE) .............. 10 2012 208 718

(51) Int. Cl.
*B64D 11/06* (2006.01)
*B64C 1/20* (2006.01)

(52) U.S. Cl.
CPC ........... *B64D 11/0696* (2013.01); *B64C 1/20* (2013.01); *Y02T 50/46* (2013.01)

(58) Field of Classification Search
CPC ... B64C 1/20; B64D 11/0696; B64D 11/3693; B64D 25/04; B64D 11/00;
(Continued)

(56) References Cited

U.S. PATENT DOCUMENTS 4,776,533 A * 10/1988 Sheek ............... B64D 11/0696
244/118.6
4,881,702 A * 11/1989 Slettebak .......... B64D 11/0693
244/118.6
(Continued)

FOREIGN PATENT DOCUMENTS

DE    10 2004 007 171    9/2005
DE    10 2004 013 878    10/2005
(Continued)

OTHER PUBLICATIONS

First Office Action issued by the European Patent and Trademark Office dated Dec. 20, 2016, for European Patent Application No. 13 725 078.3.

*Primary Examiner* — Medhat Badawi
*Assistant Examiner* — Vicente Rodriguez
(74) *Attorney, Agent, or Firm* — Saliwanchik, Lloyd & Eisenschenk (57) ABSTRACT

The invention relates to a floor connection assembly for the mechanical connection of an aircraft seat to a floor structure of an aircraft, comprising at least three fastening points, wherein the floor connection assembly can be fastened on at least three fastening points with in each case one fastening element to the floor structure. The floor connection assembly comprises an adapter plate, wherein the mechanical connection between the adapter plate and the fastening elements is supported about at least one axis in a substantially torque-free manner.

19 Claims, 4 Drawing Sheets

(58) Field of Classification Search
CPC ............ B64D 11/0693; B64D 11/0619; B64D 11/0648; B64D 11/0697; Y02T 50/46; B60N 2/015383; B60N 2/0155; B60N 2/01583; B60N 2/4249; B60N 2/42709; A47C 7/56

See application file for complete search history.

(56) References Cited

U.S. PATENT DOCUMENTS

| | | | | |
|---|---|---|---|---|
| 5,482,351 A | * | 1/1996 | Young | B60N 2/4242 |
| | | | | 297/216.1 |
| 5,662,376 A | * | 9/1997 | Breuer | B60N 2/4242 |
| | | | | 296/68.1 |
| 7,607,613 B2 | * | 10/2009 | Frantz | B64D 11/0696 |
| | | | | 244/118.6 |
| 7,618,009 B2 | | 11/2009 | Glockler | |
| 8,459,742 B2 | | 6/2013 | Saint-Jalmes et al. | |
| 2007/0080258 A1 | * | 4/2007 | Baatz | B64C 1/20 |
| | | | | 244/118.6 |
| 2010/0314494 A1 | | 12/2010 | Gasser et al. | |
| 2011/0233337 A1 | | 9/2011 | Pozzi et al. | |
| 2012/0193471 A1 | * | 8/2012 | Turschel | B60N 2/01558 |
| | | | | 244/118.6 |
| 2013/0259562 A1 | * | 10/2013 | Burd | B64D 11/04 |
| | | | | 403/187 |

FOREIGN PATENT DOCUMENTS

| | | |
|---|---|---|
| FR | 2 920 011 | 8/2007 |
| WO | WO 2013/144156 A1 | 10/2013 |

* cited by examiner

FLOOR CONNECTION ASSEMBLY OF AN AIRCRAFT SEAT

CROSS-REFERENCE TO RELATED APPLICATIONS

The present application is the U.S. National Stage Application of International Patent Application No. PCT/EP2013/001528, filed on May 24, 2013, which claims priority to German Patent Application No. 10 2012 208 718.4, filed on May 24, 2012, both of which are hereby incorporated by reference herein in their entirety, including any figures, tables, or drawings.

The invention relates to a floor connection assembly for mechanically connecting an aircraft seat to a floor structure of an aircraft, which has at least three fastening points, the floor connection assembly being fastenable to the floor structure at at least three fastening points by one fastening element each.

Aircraft seats for passenger cabins are typically fastened to the floor structure of the aircraft. They may be fastened to the floor structure at seat rails or at individual fastening points. The seat foundation is typically a metal frame having a lattice structure.

For safe use of an aircraft seat in air transport operation, the relevant authorities set out various legal air travel requirements which are intended to ensure the safety of the passenger on the aircraft seat in various situations or potential accident scenarios.

In the event of a crash, there is the requirement that the dynamic occupant load of a passenger sitting on the aircraft seat does not exceed particular thresholds under defined conditions. For this purpose, it is necessary for the aircraft seat to have an option for limiting the forces acting on the passenger by absorbing kinetic energy. The seat foundation of conventional aircraft seats therefore has a metal structure which undergoes plastic deformation in the event of a crash, accordingly absorbing kinetic energy and thus limiting the forces acting on the passenger.

The plastic deformation is distributed over the entire seat foundation. This means that the mechanical structures which support the load are deformed and thus limit the forces acting on the passenger. The deformation also leads to an altered shape and force guidance, which has to be taken into account in the configuration of the aircraft seat by way of corresponding strength reserves. This has a disadvantageous effect on the weight of the aircraft seat.

In the event of a translational crash, the deformation leads among other things to a rotational movement of a majority of the seat about a virtual centre of rotation in the vicinity of the cabin floor. In the upper region of the seat, because of the position of the resulting virtual centre of rotation, this leads to a considerable translational displacement in the upper region of the seat, which occurs in addition to the translational displacement required for energy absorption. This leads to a large movement envelope for the aircraft seat, and thus also for the occupant, in the event of a crash, and as movement space this envelope has to be kept free of further installations.

Use of a simple reinforcement of the structure for the seat foundation, so as to reduce rotation in the event of a translational crash, is counter to the safety requirement of force limitation for the passenger.

In particular, one of the official requirements for aircraft seats is that in the event of a crash prior deformation of the aircraft floor is to be anticipated and has to be absorbed or sustained by the seat foundation. The seat foundations therefore have to have mechanical yieldingness specifically in the lower region so as to be able to follow deflections in the aircraft floor structure. This is counter to a small rotational movement of the aircraft seat and to the desired small movement envelope. Seat foundations having rigid structures, but which merely allow a small deformation, therefore cannot be implemented using the solution known in the art.

Further, as a result of the prior deformation of the floor structure, a deformation of the seat foundation is accompanied by large strains and an altered shape, leading to weakening of the seat foundation, the actual crash situation with high dynamic loads only occurring subsequently.

The object of the invention is to provide a floor connection assembly which makes the use of a rigid seat foundation for an aircraft seat possible.

Starting from the preamble of claim 1, the object is achieved by the characterising features thereof. A floor connection assembly for mechanically connecting an aircraft seat to a floor structure of an aircraft is proposed, which has at least three fastening points, the floor connection assembly being fastenable to the floor structure at at least three fastening points by one fastening element each. According to the invention, the floor connection assembly comprises an adapter plate, the mechanical connection between the adapter plate and the fastening elements being mounted substantially torque-free about at least one axis.

As a result of the adapter plate and the mounting thereof at the fastening elements, which are positioned stationary on the fastening points of the floor structure, prior deformation of the floor structure of the aircraft transmits substantially no torques to the adapter plate. Substantially torque-free mounting means that only slight torques are introduced in relation to the stability of the adapter plate. During a prior deformation of the floor structure of the aircraft, the adapter plate of the floor connection assembly is therefore free of deformations, meaning that structures of an aircraft seat which are attached to the adapter plate are not affected by a prior deformation of the floor structure of the aircraft. This can make it possible to make the further structures more rigid and/or lighter, and overall this makes a lighter aircraft seat having a rigid seat foundation possible.

In a preferred embodiment, at least one connection of the adapter plate to a fastening element is displaceable in at least one direction. The displaceability of at least one fastening element with respect to the adapter plate in at least one direction makes it possible to displace fastening points in this direction largely without forces, it being possible to transmit mechanical forces in the other directions. The floor connection assembly can therefore transmit forces in all directions from the floor structure of the aircraft via the adapter plate to further structures of an aircraft seat, but not forces in all directions from the individual fastening elements.

The displaceability between the adapter plate and at least one fastening element is preferably limited. The limitation on the displaceability defines the tolerance range in which prior deformation of the floor structure can be absorbed by the floor connection assembly.

In a preferred embodiment, the floor connection assembly comprises three fastening elements, a first fastening element and a second fastening element being arranged along a longitudinal axis. The second fastening element and a third fastening element are arranged along a transverse axis, the longitudinal axis and the transverse axis being mutually perpendicular.

The longitudinal axis is preferably orientated parallel to the direction of flight of an aircraft, the longitudinal axis and the transverse axis positioned perpendicular thereto spanning a plane which is preferably positioned in the plane of the cabin floor or the floor structure or parallel thereto. This type of mounting is very suitable for force-free mounting of the adapter plate during a prior deformation of the cabin floor. In particular, this type of mounting is also suitable for use on two parallel seat rails on the floor structure of the aircraft. Further, the disclosed type of mounting at three fastening points with the fastening elements is asymmetrical about the longitudinal axis, which in usual embodiments extends substantially parallel to the primary extension direction of the aircraft. Further, the mounting is also asymmetrical about the transverse axis, neither of these embodiments being found in known constructions.

Preferably, the first fastening element is displaceable along the longitudinal axis in both directions, at least 20 mm in each case, displaceable parallel to the transverse axis in both directions, at least 3 mm in each case, and fixed parallel to a vertical axis. Preferably, further, the second fastening element is fixed along the longitudinal axis, fixed along the transverse axis, and fixed along the vertical axis. It is additionally preferred for the third fastening element to be fixed parallel to the longitudinal axis, to be displaceable along the transverse axis in both directions, at least 20 mm in each case, and to be fixed parallel to the vertical axis.

Further, in preferred embodiments, the first fastening element is fixed in rotation about the longitudinal axis, fixed in rotation about the transverse axis and fixed in rotation about a vertical axis. In addition, the second fastening element is preferably fixed in rotation about the longitudinal axis, fixed in rotation about the transverse axis and fixed in rotation about the vertical axis. Advantageously, the third fastening element is fixed in rotation about the longitudinal axis, mounted torque-free about the transverse axis, and fixed in rotation about the vertical axis.

By way of a configuration of this type of the degrees of freedom, a seat foundation of an aircraft seat can be kept free of forces during a prior deformation of the floor structure, in such a way that a rigid seat foundation can be used. In particular, a configuration of this type is suitable for obtaining a large tolerance range in relation to the position of a possible centre of rotation about which a seat rail rotates during a prior deformation of the floor structure.

Preferably, all of the fastening elements have a substantially torque-free mechanical connection to the adapter plate. This improves the decoupling of the prior deformation of the floor structure from the adapter plate, in such a way that the adapter plate can transmit all mechanical loads which occur between the aircraft seat and the floor structure in normal operation and in the event of a crash, but does not experience any deformation during a prior deformation of this type of the floor structure.

Preferably, the floor connection assembly can be fastened to the floor structure in such a way that at least one connection from the adapter plate to a fastening element has a deformation region which is provided so as to make displacement possible in at least one direction by plastic deformation. The plastic deformation of the deformation region takes place in a structural part between a fastening element, which is connected stationary on a fastening point of the floor structure, and the adapter plate. The plastic deformability in at least one direction preferably makes it possible to transmit forces in the other directions. A deformation region is advantageous because it only makes the required movement between the fastening element and the adapter plate in the corresponding direction possible when corresponding forces occur, and is thus easy to handle during assembly. Further, the corresponding movability can be achieved at a low structural weight and cost-effectively. A direction of the plastic deformation may also include a rotation.

A connection of this type may also be referred to as a plastic hinge, the plasticity relating to the provided mechanical deformability above an elastic limit of the material in the deformation region of the connection.

The corresponding deformation region can further reduce shocks in the event of a crash by absorbing energy, and this can be advantageous for the occupant and seat structure loads.

In an advantageous embodiment, the mechanical connection between the adapter plate and at least one fastening element may be a ball head mounting. A ball head mounting is an advantageous embodiment for achieving torque-free mounting of the floor connection assembly.

In a further advantageous embodiment, the mechanical connection between the adapter plate and at least one fastening element comprises an elastomer bearing. An elastomer bearing makes torque-free mounting possible and can additionally reduce the transmission of vibrations and structure-borne noise between the floor structure and the floor connection assembly during normal operation, and this may increase comfort for the passenger.

The mechanical connection between the adapter plate and at least one fastening element advantageously has a sliding fit. The mechanical mounting using a sliding fit is an advantageous embodiment for making displacement possible in at least one direction in the mounting. Forces perpendicular to the displaceability can be transmitted by a bearing comprising a sliding fit. There is further the option of simultaneously torque-free mounting about an axis of rotation.

The floor connection assembly is preferably mounted in such a way that deflection of the fastening points from the initial position thereof by less than 200 mm does not cause significant deformation of the adapter plate. Mounting of this type defines the tolerance zone, and restricts the possible prior deformation of the floor structure. Restricting the tolerance zone limits the corresponding structural weight, and this is advantageous because of the air travel application.

Preferably, two of the fastening points at which the floor connection assembly can be fastened are positioned on one seat rail. The floor connection assembly is mounted in such a way that a rotation of the seat rail through at least 10° about a centre of rotation, which is positioned within the seat rail and within a 1 m radius of the geometric centre of the floor connection assembly, does not bring about irreversible deformation of the adapter plate. Mounting of this type is very suitable for the use of a rigid seat foundation, since virtually no prior deformation or deformation has to be absorbed by the seat foundation during the crash of the floor structure itself, and this in particular makes the use of light fibre composite materials possible.

In a preferred embodiment, at least one attachment point for a seat foundation is provided on the adapter plate. The attachment point makes mechanical connection to the seat foundation possible, preferably using a releasable connection by way of means such as screws, bolts and/or screw sockets.

Further, in an advantageous embodiment a seat foundation can be moved in translation and/or in rotation in the floor plane on the floor connection assembly. The translational movability of a seat foundation on the floor connection assembly is advantageous for use of an aircraft seat so as to be able to move the aircraft seat in the cabin if required, for example towards or away from a table. Rotational movability of the seat foundation on the floor connection assembly makes it possible to change the seat orientation, and this can increase the flexibility of use of the aircraft seat.

In an alternative advantageous embodiment, the adapter plate is an integral part together with a seat foundation. The proposed embodiment makes light and rigid connection of a seat foundation to the floor connection assembly possible. Further, the number of parts is reduced as a result of the integral construction and better guidance of forces is made possible.

Preferably, the floor connection assembly comprises at least one bridge construction, the bridge construction being mounted torque-free about at least one axis at at least one fastening element. The bridge construction is advantageous for a light floor connection assembly and advantageously makes it possible to deform the floor structure with negligible resultant forces in the adapter plate. Both for an embodiment having three fastening elements and for a possible embodiment on four fastening elements, for example on two seat rails, the adapter plate may be configured identically with a bridge construction.

The bridge construction is preferably connected to the adapter plate in a torque-free manner. The tolerance of the floor connection assembly against deformations of the floor structure of the aircraft can thus be increased.

The adapter plate is preferably a fibre composite component. The embodiment of the adapter plate as a fibre composite component having for example a proportion of carbon fibres in the structural weight makes high rigidity possible at a low weight, whilst as a result of the floor connection assembly according to the invention the adapter plate does not have to follow any deformations from the floor structure, improving the applicability of fibre composite structures.

Further, the adapter plate preferably has a sandwich structure. This makes a very light and above all flexurally rigid adapter plate possible.

The object of the invention is further achieved starting from the preamble of the final claim by the characterising features thereof. An aircraft seat is proposed, a floor connection assembly being provided. The floor connection assembly may be the foot of an aircraft seat. An aircraft seat comprising a rigid seat foundation can advantageously be connected to a floor structure of an aircraft by means of the floor connection assembly. This may also be advantageous for assembling and disassembling the aircraft seat.

In the following, the invention is described by way of preferred embodiments, referring to the accompanying drawings, in which.

Figure 1:
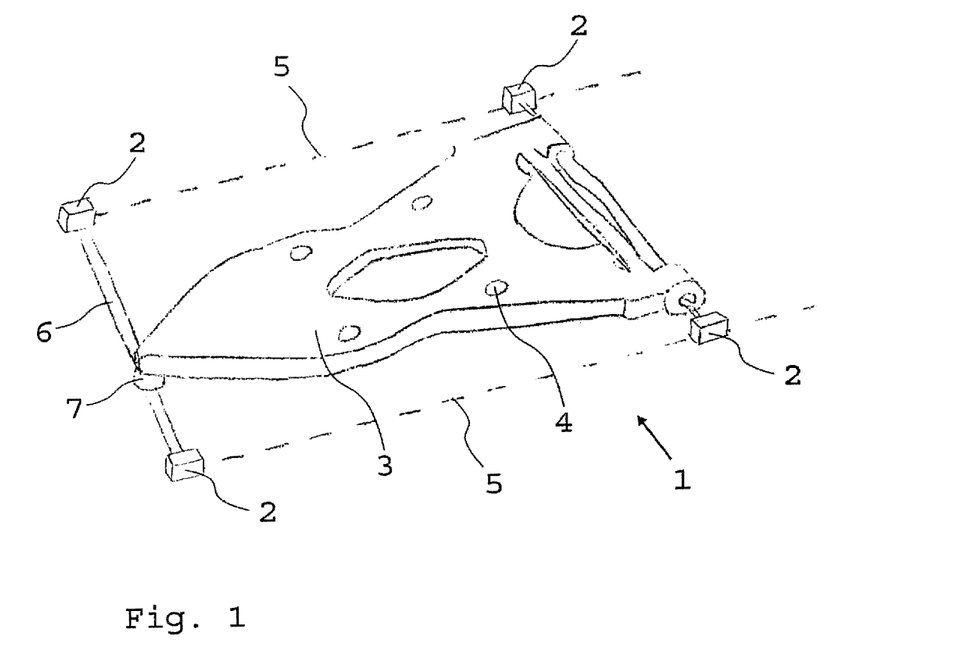
FIG. 1 shows a floor connection assembly having a bridge construction at two seat rails.

FIG. 1 shows an embodiment of a floor connection assembly 1 comprising an adapter plate 3, the adapter plate 3 being set up to be connected to a seat foundation 10 (not shown in FIG. 1) by means of for example four attachment points 4. The seat foundation 10 may form a pedestal on which further assemblies of an aircraft seat 8 can be arranged. The floor connection assembly 1 can be fastened by fastening elements 2 to the floor structure of an aircraft.

The floor structure of the aircraft is the mechanical structure in the aircraft for receiving the mechanical loads acting on the cabin floor. In this embodiment, the floor structure comprises two seat rails 5, which each comprise a plurality of possible fastening points along the main axis thereof.

The four fastening elements 2 of the floor connection assembly 1 are arranged stationary on four fastening points on the seat rails 5, two of the fastening elements 2 being arranged on each seat rail 5, The fastening elements 2 may for example be screwed, clamped and/or otherwise mechanically connected to the seat rail 5 at a fastening point, so as to make transmission of forces possible between the floor structure via the seat rail 5 and the floor connection assembly 1 via the fastening element 2. The fastening elements 2 constitute a non-displaceable connection to the floor structure.

In one possible embodiment, a substantially torque-free mechanical connection between the fastening elements 2 and the adapter plate 3 may be configured by way of a ball head joint. The ball head joint transmits translational loads, the joint making rotational freedom possible in an angular range in such a way that no torques are transmitted through this joint. A part of the ball head joint may be a part of the fastening element 2.

In a further possible embodiment, the mechanical connection between one or more fastening elements 2 and the adapter plate 3 is formed by elastomer bearings, as a result of which substantially torque-free mounting is implemented at this point. Elastomer bearings comprise a connection of two parts which are movable with respect to one another, the relative movability being achieved by way of a resilient material arranged between the two parts.

Further, the mechanical connection may have a constructionally provided plastic deformability, as a result of which displacement in a direction can be achieved by way of a corresponding force acting in this direction, a force and/or torque transmission in other directions further being possible. The plastic deformation preferably occurs before the force and/or torque action brings about deformation of the adapter plate 3.

The mechanical connection within the floor connection assembly 1 between the fastening elements 2 and the adapter plate 3 is substantially torque-free. Substantially torque-free means that the mounting or the mechanical connection is not provided to transmit mechanical torques, and relative rotation of this mechanical connection is thus possible. However, small torques may be transmitted during the relative rotation, but this does not counter the substantially torque-free mounting.

In an advantageous embodiment, the mechanical connection between at least one fastening element 2 and the adapter plate 3 is displaceable. In this context, displaceable means that the mechanical connection does not transmit any significant forces along the axis of the displaceability, and relative movement between the fastening element 2 and adapter plate 3 is possible along this axis. In this context, displaceability along an axis means still no displaceability in the directions of the other axes, in such a way that they can still transmit forces.

The displaceability of the mechanical connection between the fastening element 2 is preferably not used for translational movement of the aircraft seat 8 with respect to the floor structure, but instead for the described largely force-free relative movement within the floor connection assembly 1 in the event of deformation of the floor structure. A translational movement, for example so as to be able to advance the aircraft seat 8 towards a table, may for example be implemented by way of a relative movement between the floor connection assembly 1 and the seat foundation 10 and/or by way of a relative movement between the seat foundation 10 and a seat surface.

The adapter plate 3 is a substantially planar formation, which is arranged between the fastening elements 2. The adapter plate 3 is configured as dimensionally stable and rigid as possible so as to make transmission of mechanical, in particular dynamic loads possible between the seat foundation 10 of the aircraft seat 8 and the floor structure largely without deformation. In a preferred embodiment, the adapter plate 3 may comprise a carbon-fibre-reinforced structure. The adapter plate 3 may also further comprise a sandwich construction, using for example mechanical foams and/or honeycomb structures. This should make a very rigid and simultaneously light structure possible overall for the adapter plate 3. The attachment points 4 for a seat foundation 10 may be metal inserts, which make screwing and/or bolting possible and may be integrated into the adapter plate 3.

The adapter plate 3 may be orientated substantially parallel to the floor plane of the aircraft cabin. In advantageous embodiments, the adapter plate 3 is arranged above the floor plane of the aircraft cabin, which serves as a walking surface for passengers. In possible alternative embodiments, the adapter plate 3 may be arranged in such a way that the floor plane is positioned within or at the boundaries of the adapter plate 3. As a further alternative, the adapter plate 3 may be arranged below the floor plane.

In a possible embodiment, various recesses and/or clearances may be provided in the adapter plate 3, making a reduced-weight adapter plate possible.

In the embodiment shown in FIG. 1, the floor connection assembly 1 has a bridge construction 6 at a first end. The bridge construction 6 is arranged between two fastening elements 2 and mechanically connected thereto. In this embodiment, the mechanical connection to one or both fastening elements 2 is torque-free, in such a way that no significant torques from the fastening elements 2 can be introduced into the bridge construction 6. The bridge construction 6 is advantageously a flexurally rigid construction.

In possible embodiments, the bridge construction 6 is connected to a fastening element 2 and/or the adapter plate 3 so as to be displaceable along an axis, especially the axis of the longest extension thereof perpendicular to a typical orientation of the seat rails 5, in such a way that in these regions no significant forces can be transmitted in this axis, making prior deformation of the floor structure possible without introduction of forces into the adapter plate 3. The displaceability may for example be implemented by way of a floating bearing, and this is advantageously carried out by way of a slot having a sliding fit and/or also by way of a plastic hinge.

In this embodiment the bridge construction 6 is further connected to the adapter plate 3 in a torque-free manner via a transition piece 7.

In further embodiments, during the installation or assembly of the floor connection assembly 1, a parallel offset of the adapter plate 3 and/or the four attachment points 4 with respect to the seat rails 5 can be set. As a result, the aircraft seat 8 can be arranged at various positions transverse to the direction of flight whilst fastening to the same fastening points, expanding the cabin configuration options. The position of the central line or line of symmetry of the aircraft seat 8 is advantageously set between the seat rails 5. This setting typically requires an assembly process and is to be considered separate from a possible translational movement of the aircraft seat 8, which can be undertaken for example by a passenger. In one possible embodiment, the position of the aircraft seat transverse to the direction of flight, for example along the transverse axis B (see FIG. 3), can be set by way of various settings and/or selection of the length of the mechanical connection between the adapter plate 3 and the fastening elements 2.

Figure 2:
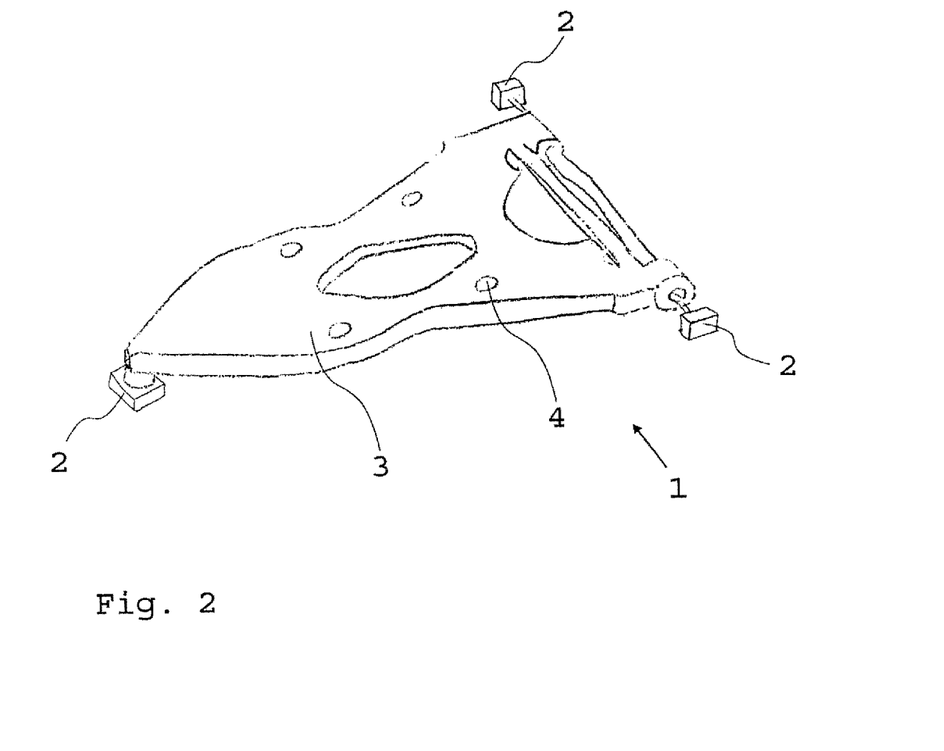
FIG. 2 shows a floor connection assembly comprising three fastening elements.

FIG. 2 shows a floor connection assembly 1, which is connected to a floor structure at three fastening points by three fastening elements 2. The fastening points can be integrated into the aircraft floor at various points, since in this embodiment the floor structure does not comprise a seat rail.

Figure 3:
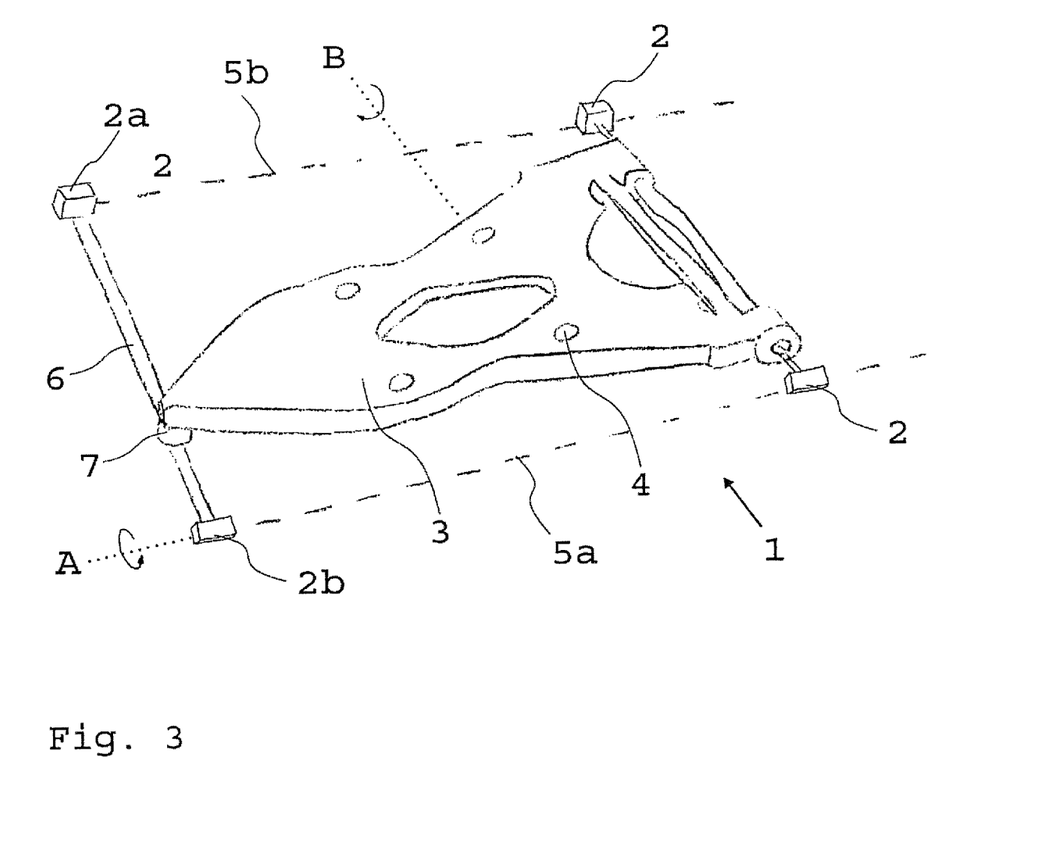
FIG. 3 shows a floor connection assembly after a prior deformation of the floor structure.

FIG. 3 shows the floor connection assembly 1 of FIG. 1 after a prior deformation of the floor structure. The floor connection assembly 1 is connected by way of the fastening elements 2, which are rigidly connected to the seat rails 5. In this case, the front seat rail 5a shown in FIG. 3 is rotated about a longitudinal axis A. The rear seat rail 5b shown in FIG. 3 is rotated about a transverse axis B. This leads to a rotation and to a deflection of the fastening elements 2 with respect to the adapter plate 3 in accordance with the prior deformation of the floor structure, which is passed on to the floor connection assembly 1 via the rotation of the seat rail 5b, and in accordance with the geometric arrangement.

The torque-free mechanical mounting between the fastening elements 2 and the adapter plate 3 leads to the floor connection assembly 1 receiving the rotation of the rail 5a, without this leading to deformation of, or damage to, the adapter plate 3. Mechanical loads can therefore further be transmitted between the adapter plate and the floor structure in the pre-deformation state so as to ensure a secure connection.

The possible prior deformation shown in FIG. 3 of the floor structure, in the form of a rotation of the seat rail 5b, leads to a displacement of the position of the fastening elements 2 with respect to the adapter plate 3 as well as a rotation of the fastening elements 2 with respect to the adapter plate 3. In this embodiment, the mechanical connection between the fastening element 2a and the bridge construction 6 or adapter plate 3 is displaceable in the direction B, whereas the connection between the fastening element 2b and the adapter plate 3 is not displaceable in this embodiment. The adapter plate 3 therefore sustains the deformations of the floor structure without substantial deformations of the adapter plate 3. However, the transmissibility of mechanical loads is maintained. The same applies to the embodiment without a bridge construction 6 and to the side of the floor connection assembly 1 without a bridge construction 6.

The aircraft seat structure which is rigid in particular in the region of the cabin floor is advantageous for a crash event, anticipated after the prior deformation, with high dynamic loads from the corresponding accelerations due to the crash. A rigid seat foundation 10, which can be connected to the adapter plate 3 at the attachment points 4, does not experience any damage and/or negative influence from the prior deformation of the floor structure. In this way, the ability to bear in particular dynamic loads in the event of a crash is maintained, in such a way that the structure can be configured accordingly precisely, it being possible to exploit this in particular for weight reduction. The loads from the crash can thus with negligible deformations of the seat foundation 10 be passed on for example as far as a seat surface, backrest and/or belt attachment point. The force limitation for protecting the passenger may take place above the seat foundation 10, for example in the transition region to the aforementioned seat components which may be in direct contact with an occupant. The force limitation may be implemented by a device which is correspondingly provided in this transition region and configured for this purpose. A resultant rotational movement of the seat can be prevented.

There may be a functional separation in the aircraft seat 8 between absorbing mechanical loads, in particular in the event of a crash, and absorbing prior deformations of the floor structure. As a result, targeted configuration of the force limitation for the event of a crash may be provided.

In a preferred embodiment, the floor connection assembly 1 further serves for the mechanical connection of merely one aircraft seat 8 to a floor structure. However, it is also possible to arrange more than one seat on the floor connection assembly 1, for example two seats.

Figure 4:
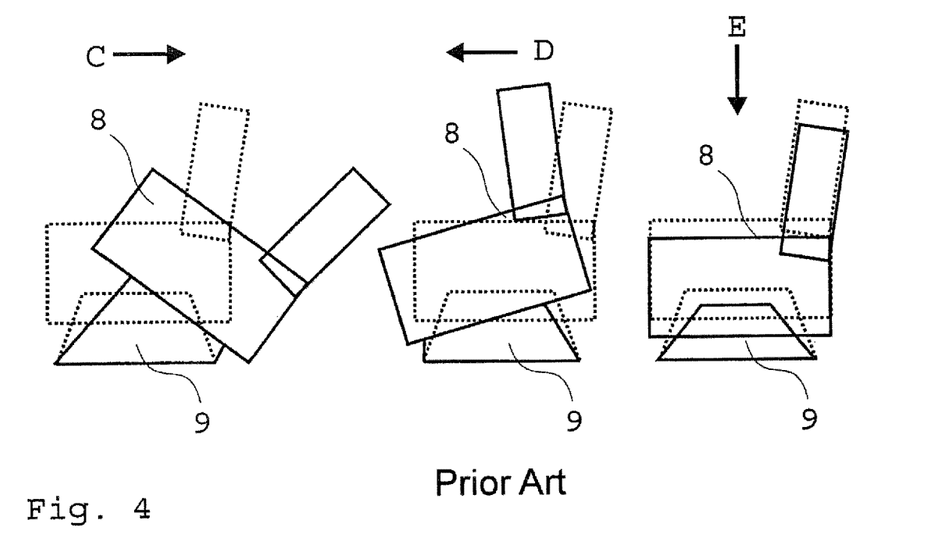
FIG. 4 shows a prior art aircraft seat.

FIG. 4 shows a prior art aircraft seat 8 comprising a seat frame 9. The prior art aircraft seat 8 is shown together with the deformation properties thereof after three possible crash events having different acceleration directions C, D, E of the centre of gravity of a seated passenger, not shown in FIG. 4.

The seat frame 9 is configured appropriately plastically deformable for absorbing the prior deformation. This applies in particular to the lower part. This side view does not show prior deformation of the floor structure of the aircraft. The seat frame 9 absorbs the loads as well as the prior deformation in the event of a crash with high accelerations. The limitation of the forces acting on a seated passenger is achieved by way of the flexible structure of the seat frame 9. Overall, a comparatively large deformation sets in the lower region of the aircraft seat 8, and leads to a rotation of the aircraft seat 8, the centre of rotation being low with respect to the seat surface of the aircraft seat 8, leading to large deflections in the upper region of the aircraft seat 8.

The deflection in the event of a crash defines the movement envelope of the aircraft seat 8 and of the seated passenger, which has to be kept free of articles and/or objects in the cabin of the aircraft to prevent injuries. In the prior art, there is a correspondingly large movement envelope. A more rigid configuration of the seat frame 9 is not possible in the prior art because of the necessary absorption of prior deformations of the floor structure of the aircraft by the seat frame 9 and the required force limitation for the passenger by absorbing kinetic energy in the event of a crash.

Alternatively, there is the option of keeping the free space around the passenger sufficiently small that the path to the boundary of the free space, for example a table or further aircraft seat, is sufficiently short in the event of a crash that no significant relative speeds between the passenger and adjacent parts can occur before a collision. However, this leads to considerable losses of comfort during normal operation. Further, cushioning of the corresponding parts may nevertheless become necessary, and this is impractical for example for a table surface.

Figure 5:
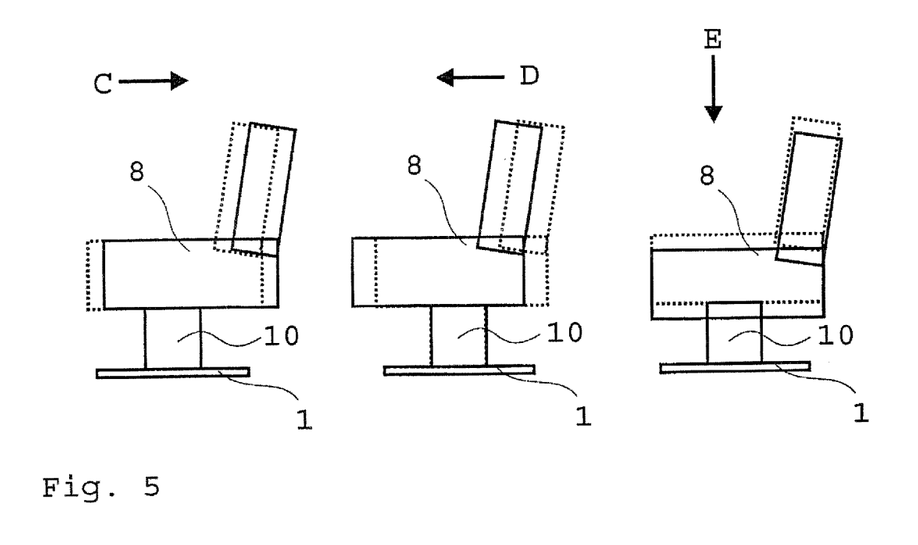
FIG. 5 shows an aircraft seat comprising a floor connection assembly and a rigid seat foundation.

FIG. 5 shows three aircraft seats 8 comprising an embodiment of a floor connection assembly 1, which experience the same accelerations from different crashes as the aircraft seats in FIG. 4. The floor connection assembly 1 does not pass on prior deformations of the floor structure of the aircraft to the seat foundation 10. Therefore, the seat foundation 10 does not have to be able to absorb deformations, and can be made very rigid. Further, the use of light and rigid materials having a low deformation potential, such as for example carbon-fibre-reinforced plastics materials, is made possible, and this can lead to a lighter aircraft seat 8. The rigid configuration of the seat foundation 10 has various advantages for the crash; for example, a rotational movement of the aircraft seat 8 can be largely suppressed in the crash for acceleration directions in the floor plane C, D and/or the energy absorption or force limitation may take place selectively above the seat foundation 10, making a small movement envelope and a lower structural load of the aircraft seat 8 possible in the crash.

In one possible embodiment, the floor connection assembly 1 may be covered with a compensation cover, resulting in an aesthetically pleasing floor configuration.

A preferred application of the floor connection assembly 1 of an aircraft seat 8 is in the VIP area or special equipment area for aircraft, in particular for individual seats, armchairs and cushioned furnishings. The floor connection assembly 1 may further advantageously be used for aircraft seats 8 in high-standard cabin divisions of an aircraft, known as first class seats.

Figure 6:
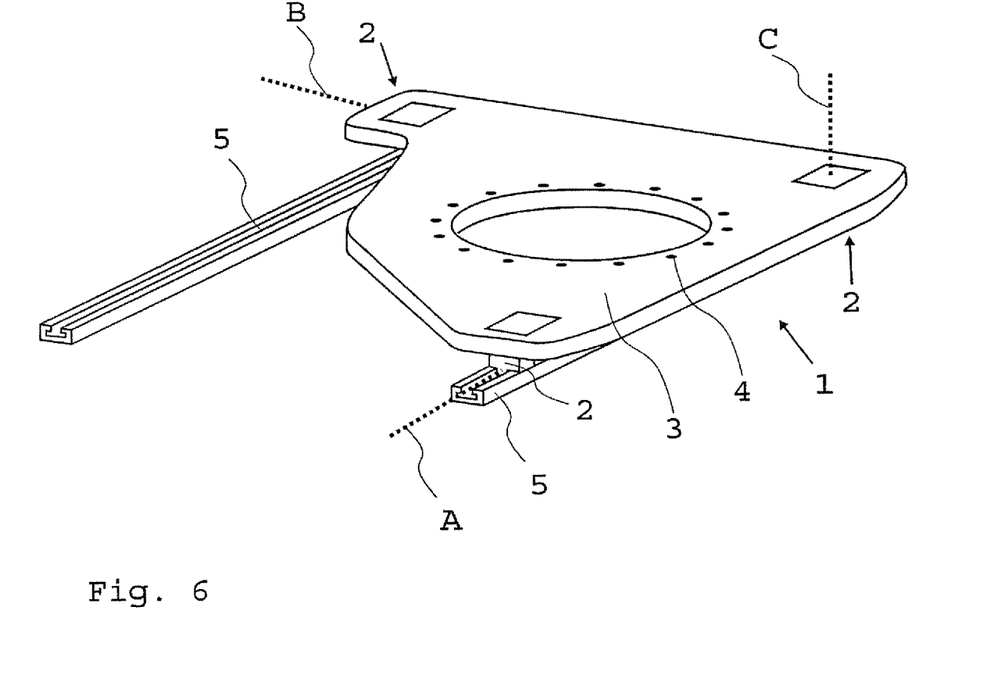
FIG. 6 shows a floor connection assembly.

FIG. 6 shows an embodiment of a floor connection assembly 1 which is fastened by one fastening element 2 each to the floor structure of an aircraft at three fastening points. The three fastening points are located on two parallel seat rails 5. A first fastening element 2 is arranged along the longitudinal axis A and is preferably configured displaceable parallel to the longitudinal axis A. The displaceability may in particular be achieved in the first fastening element 2 and parallel to the longitudinal axis A by way of a movable or displaceable mechanical connection between the first fastening element 2 and the adapter plate 3 or by way of displaceability of the first fastening element 2 in the seat rail 5. The first fastening element 2 is the sole visible fastening element in FIG. 6. The second and third fastening elements 2 are covered by parts of the adapter plate and are merely indicated in terms of position.

The first fastening element 2 is preferably arranged at the front of the floor connection assembly 1 in the seating direction, and further preferably has no corresponding fastening element 2 on the other seat rail 5 along the transverse axis B. The floor connection assembly 1 thus has an asymmetrical configuration. Parallel to the transverse axis B, the first fastening element 2 preferably has a displaceable connection to the adapter plate 3. Further, preferably no displaceability is provided in the direction of a vertical axis C, which preferably extends perpendicular to the longitudinal axis A and the transverse axis B. In preferred embodiments, the first fastening element 2 has no rotational degrees of freedom.

In this advantageous embodiment, a second fastening element 2 of the adapter plate 3 is fastened on the same seat rail 5. It is therefore positioned in the same longitudinal axis A as the first fastening element 2. The third fastening element 2 is fastened to the other seat rail 5 from the second fastening element 2. In advantageous embodiments, the second fastening element 2 has no rotational and no translational degrees of freedom with respect to the seat rail 5 and with respect to the adapter plate 3.

The third fastening element 2 is provided as a single fastening element 2 on the seat rail 5 shown at the top of FIG. 6. The third fastening element 2 preferably has no translational and no rotational movability along the longitudinal axis A and along the vertical axis C. Displaceability of the third fastening element 2 along the transverse axis B by at least 20 mm from a normal position with respect to the adapter plate 3 is advantageous. In addition, the third fastening element 2 is preferably mounted on the adapter plate 3 torque-free about the transverse axis B. Overall, a reflected configuration of the fastening elements 2 having defined degrees of freedom is also possible, but it is advantageous for the first and second fastening element 2 always to be arranged on one seat rail 5 and the third fastening element 2 to be arranged at the shortest distance from the second fastening element 2 on the remaining seat rail 5.

Rotation of a seat rail 5 about the longitudinal axis A or about an axis of rotation located in the vicinity can be compensated during a prior deformation, preferably by a translational compensation movement of the connection between the fastening elements 2 and the adapter plate 3.

The invention claimed is:

1. A floor connection assembly for mechanically connecting an aircraft seat to a floor structure of an aircraft, comprising:
    an adapter plate; and
    at least three fastening elements,
    wherein the floor connection assembly is configured to mechanically connect to a floor structure of an aircraft, such that:
        (i) the adapter plate is mechanically connected to the floor structure of the aircraft by mechanical connection of each fastening element of the at least three fastening elements to a corresponding fastening point on the floor structure of the aircraft of a corresponding at least three fastening points on the floor structure of the aircraft, and
        (ii) the adapter plate is mechanically connected to the at least three fastening elements such that each fastening element of the at least three fastening elements is mechanically connected to the adapter plate,
    wherein each fastening element of the at least three fastening elements is configured to mechanically connect to the adapter plate such that the mechanical connection of the adapter plate to each fastening element of the at least three fastening elements is substantially torque-free about a corresponding at least one axis, such that when the at least three fastening elements are mechanically connected to the at least three fastening points on the floor structure of the aircraft, and the floor structure rotates a fastening element of the at least three fastening elements about the corresponding at least one axis, torque is not transferred to the adapter plate about the corresponding at least one axis by the fastening element of the at least three fastening elements,
    wherein the at least three fastening elements comprise:
        a first fastening element;
        a second fastening element; and
        a third fastening element,
    wherein the first fastening element and the second fastening element are arranged along a first longitudinal axis,
    wherein the third fastening element is arranged along a second longitudinal axis parallel to the first longitudinal axis,
    wherein the first fastening element is arranged along a first transverse axis,
    wherein the second fastening element and the third fastening element are arranged along a second transverse axis parallel to the first transverse axis,
    wherein the first transverse axis is perpendicular to the first longitudinal axis,
    wherein the first fastening element is:
        displaceable in both directions along the first longitudinal axis, such that when the at least three fastening elements are mechanically connected to the at least three fastening points on the floor structure of the aircraft so that the first fastening element is mechanically connected to a corresponding first fastening point of the at least three fastening points on the floor structure of the aircraft, and the floor structure moves the first fastening point of the at least three fastening points along the first longitudinal axis axis, force is not transferred to the adapter plate along the first longitudinal axis by the first fastening element of the at least three fastening elements,
        displaceable in both directions along the first transverse axis, such that when the at least three fastening elements are mechanically connected to the at least three fastening points on the floor structure of the aircraft so that the first fastening element is mechanically connected to the corresponding first fastening point of the at least three fastening points on the floor structure of the aircraft, and the floor structure moves the first fastening point of the at least three fastening points along the first transverse axis axis, force is not transferred to the adapter plate along the first transverse axis by the first fastening element of the at least three fastening elements, and
        fixed along a first vertical axis,
        wherein the first vertical axis is perpendicular to the first longitudinal axis and perpendicular to the first transverse axis,
    wherein the second fastening element is:
        fixed along the first longitudinal axis,
        fixed along the second transverse axis, and
        fixed along a second vertical axis parallel to the first vertical axis,
    wherein the third fastening element is:
        fixed along the second longitudinal axis,
        displaceable in both directions along the second transverse axis, such that when the at least three fastening elements are mechanically connected to the at least three fastening points on the floor structure of the aircraft so that the third fastening element is mechanically connected to a corresponding third fastening point of the at least three fastening points on the floor structure of the aircraft, and the floor structure moves the third fastening point of the at least three fastening points along the second transverse axis, force is not transferred to the adapter plate along the second transverse axis by the third fastening element of the at least three fastening elements, and
        fixed along a third vertical axis parallel to the first vertical axis.

2. The floor connection assembly according to claim 1, wherein when the floor connection assembly is mechanically connected to the floor structure of the aircraft, each fastening element of the at least three fastening elements has a substantially torque-free mechanical connection to the adapter plate, such that when the floor structure rotates a fastening element of the at least three fastening elements, torque is not transferred to the adapter plate by the fastening element of the at least three fastening elements.

3. The floor connection assembly according to claim 2, wherein the at least three fastening elements is three fastening elements,
wherein the first fastening element is:
    displaceable in both directions along the first longitudinal axis via the mechanical connection of the adapter plate to the first fastening element being displaceable in both directions along the first longitudinal axis, and displaceable in both directions along the first transverse axis via the mechanical connection of the adapter plate to the first fastening element being displaceable in both directions along the first transverse axis, and wherein the third fastening element is:

displaceable in both directions along the second transverse axis via the mechanical connection of the adapter plate to the second fastening element being displaceable in both directions along the second transverse axis.

4. The floor connection assembly according to claim 1, wherein when the floor connection assembly is mechanically connected to the floor structure of the aircraft, at least one mechanical connection from the adapter plate to a corresponding at least one fastening element of the at least three fastening elements has a corresponding at least one deformation region that makes displacement possible in a corresponding at least one direction by plastic deformation.

5. The floor connection assembly according to claim 1, wherein when the floor connection assembly is mechanically connected to the floor structure of the aircraft, at least one fastening element of the at least three fastening elements is mechanically connected to the adapter plate via one of the following:

a ball head bearing,
an elastomer bearing, and
a mount having a sliding fit.

6. The floor connection assembly according to claim 1, wherein when the floor connection assembly is mechanically connected to the floor structure of the aircraft, deflection of one or more fastening points of the at least three fastening points from one or more initial positions of a corresponding at least three initial positions by less than 200 mm does not cause significant deformation of the adapter plate.

7. The floor connection assembly according to claim 1, wherein:

the adapter plate comprises at least one attachment point for a seat foundation to be mechanically connected to the adapter plate; or the adapter plate is an integral part together with a seat foundation.

8. The floor connection assembly according to claim 1, wherein the adapter plate is a fiber composite component or the adapter plate has a sandwich structure.

9. An aircraft seat assembly, comprising:
an aircraft seat; and
a floor connection assembly according to claim 1.

10. The floor connection assembly according to claim 1, wherein the first fastening element is:
fixed in rotation about the first longitudinal axis,
fixed in rotation about the first transverse axis, and
fixed in rotation about the first vertical axis,
wherein the second fastening element is:
fixed in rotation about the first longitudinal axis,
fixed in rotation about the second transverse axis, and
fixed in rotation about the second vertical axis, and
wherein the third fastening element is:
fixed in rotation about the second longitudinal axis,
mounted torque-free about the second transverse axis, and
fixed in rotation about the third vertical axis.

11. The floor connection assembly according to claim 1, wherein the first fastening element is:
displaceable at least 20 mm along the first longitudinal axis in both directions, and
displaceable at least 3 mm parallel to the first transverse axis in both directions, and
wherein the third fastening element is displaceable at least 20 mm along the second transverse axis.

12. The floor connection assembly according to claim 1, wherein the floor connection assembly comprises a bridge construction, and wherein when the floor connection assembly is mechanically connected to the floor structure of the aircraft, the adapter plate is mechanically connected to two fastening elements of the at least three fastening elements via the bridge construction, such that the adapter plate is mechanically connected to the bridge construction and the bridge construction is mounted to the two fastening elements of the at least two fastening elements, and the bridge construction is mounted to one or more of the two fastening elements of the at least three fastening elements torque-free about a corresponding one or more axes.

13. The floor connection assembly according to claim 12, wherein the bridge construction is mechanically connected to the adapter plate in a torque-free manner.

14. The floor connection assembly according to claim 1, wherein the floor connection assembly is configured to mechanically connect to a floor structure of an aircraft having a seat rail, and wherein when the floor connection assembly is mechanically connected to the floor structure of the aircraft, two fastening points of the at least three fastening points are positioned on the seat rail of the floor structure of the aircraft.

15. The floor connection assembly according to claim 1, wherein the floor connection assembly is configured to mechanically connect to a floor structure of an aircraft having a seat rail, and wherein when the floor connection assembly is mechanically connected to the floor structure of the aircraft, two fastening points of the at least three fastening points are positioned on the seat rail of the floor structure of the aircraft, and rotation of the seat rail through at least 10° about a center of rotation positioned within the seat rail and within a 1 m radius of a geometric center of the floor connection assembly, does not bring about irreversible deformation of the adapter plate.

16. The floor connection assembly according to claim 15, wherein at least one mechanical connection of the adapter plate to a corresponding at least one fastening element of the at least three fastening elements is displaceable in a corresponding at least one direction, and wherein one or more displaceabilities of a corresponding one or more mechanical connections the at least one mechanical connection of the adapter plate to the at least one fastening element of the at least three fastening elements are limited.

17. A floor connection assembly for mechanically connecting an aircraft seat to a floor structure of an aircraft, comprising:

an adapter plate; and
at least three fastening elements,
wherein the floor connection assembly is configured to mechanically connect to a floor structure of an aircraft, such that:

(i) the adapter plate is mechanically connected to the floor structure of the aircraft by mechanical connection of each fastening element of the at least three fastening elements to a corresponding fastening point on the floor structure of the aircraft of a corresponding at least three fastening points on the floor structure of the aircraft, and (ii) the adapter plate is mechanically connected to the at least three fastening elements such that each fastening element of the at least three fastening elements is mechanically connected to the adapter plate, wherein each fastening element of the at least three fastening elements is configured to mechanically connect to the adapter plate such that the mechanical connection of the adapter plate to each fastening element of the at least three fastening elements is substantially torque-free about a corresponding at least one axis, such that when the at least three fastening elements are mechanically connected to the at least three fastening points on the floor structure of the aircraft, and the floor structure rotates a fastening element of the at least three fastening elements about the corresponding at least one axis, torque is not transferred to the adapter plate about the corresponding at least one axis by the fastening element of the at least three fastening elements, and wherein when a seat foundation is mechanically connected to the adapter plate and when the floor connection assembly is mechanically connected to the floor structure of the aircraft, the seat foundation is moveable:
  in translation;
  in rotation in a floor plane on the floor connection assembly; or
  in translation and in rotation in a floor plane on the floor connection assembly, wherein the at least three fastening elements comprise:
  a first fastening element;
  a second fastening element; and
  a third fastening element, wherein the first fastening element and the second fastening element are arranged along a first longitudinal axis, wherein the third fastening element is arranged along a second longitudinal axis parallel to the first longitudinal axis, wherein the first fastening element is arranged along a first transverse axis, wherein the second fastening element and the third fastening element are arranged along a second transverse axis parallel to the first transverse axis, wherein the first transverse axis is perpendicular to the first longitudinal axis, wherein the first fastening element is:
  fixed in rotation about the first longitudinal axis,
  fixed in rotation about the first transverse axis, and
  fixed in rotation about a first vertical axis, wherein the first vertical axis is perpendicular to the first longitudinal axis and perpendicular to the first transverse axis, wherein the second fastening element is:
  fixed in rotation about the first longitudinal axis,
  fixed in rotation about the second transverse axis, and
  fixed in rotation about a second vertical axis parallel to the first vertical axis, and wherein the third fastening element is:
  fixed in rotation about the second longitudinal axis,
  mounted to the adapter plate torque-free about the second transverse axis, and
  fixed in rotation about a third vertical axis parallel to the second vertical axis, wherein the floor connection assembly comprises a bridge construction, and wherein when the floor connection assembly is mechanically connected to the floor structure of the aircraft, the adapter plate is mechanically connected to two fastening elements of the at least three fastening elements via the bridge construction, such that the adapter plate is mechanically connected to the bridge construction and the bridge construction is mounted to the two fastening elements of the at least two fastening elements, and the bridge construction is mounted to one or more of the two fastening elements of the at least three fastening elements torque-free about a corresponding one or more axes.

18. The floor connection assembly according to claim 17, wherein the bridge construction is mechanically connected to the adapter plate in a torque-free manner.

19. An aircraft seat assembly, comprising:
an aircraft seat; and
a floor connection assembly according to claim 17.

* * * * *